(12) United States Patent
Nakamura et al.

(10) Patent No.: US 7,890,879 B2
(45) Date of Patent: Feb. 15, 2011

(54) DISPLAY CONTROLLER, IMAGE PROCESSING APPARATUS, AND DISPLAY CONTROL METHOD

(75) Inventors: Mahina Nakamura, Musashino (JP); Maki Sato, Yokohama (JP); Tsunehiro Motegi, Shinjuku (JP); Yumiko Okuma, Nakano (JP); Yasutsugu Sasaki, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 946 days.

(21) Appl. No.: 11/736,692

(22) Filed: Apr. 18, 2007

(65) Prior Publication Data

US 2007/0250785 A1  Oct. 25, 2007

(30) Foreign Application Priority Data

Apr. 20, 2006 (JP) .............................. 2006-116714

(51) Int. Cl.
G06F 3/00 (2006.01)
(52) U.S. Cl. ....................... 715/764; 715/750; 715/751; 715/754; 715/761; 715/856
(58) Field of Classification Search ................. 715/750, 715/751, 754, 761, 764, 856
See application file for complete search history.

(56) References Cited

U.S. PATENT DOCUMENTS 7,464,338 B2 * 12/2008 Sato ........................... 715/750

| | | | |
|---|---|---|---|
| 2007/0033262 A1 * | 2/2007 | Labelle et al. | 709/217 |
| 2007/0247641 A1 | 10/2007 | Okuma et al. | |
| 2007/0247642 A1 | 10/2007 | Nakamura et al. | |
| 2007/0247643 A1 | 10/2007 | Nakamura et al. | |
| 2007/0250936 A1 | 10/2007 | Nakamura et al. | |
| 2007/0283293 A1 | 12/2007 | Nakamura et al. | |

FOREIGN PATENT DOCUMENTS

| JP | 2002-232684 | 8/2002 |
|---|---|---|
| JP | 2004-282439 | 10/2004 |
| JP | 2005-115683 | 4/2005 |
| JP | 2005-208315 | 8/2005 |

* cited by examiner

*Primary Examiner*—Weilun Lo
*Assistant Examiner*—Mylinh Tran
(74) *Attorney, Agent, or Firm*—Turocy & Watson, LLP

(57) ABSTRACT

There is provided a technique concerning a preview display function used when predetermined processing is performed for predetermined data, which contribute to enhancement of user's convenience.

A display controller comprises: a control section 205 that displays, based on the information acquired by the relevance information acquisition section 203, the objects to be displayed extracted by the extraction section 202 in the display area 902 and 903, such that objects to be displayed having higher relevance than those to be displayed in the area 903 are displayed in the area 902 and, at the same time, displays the target data acquired by the target data acquisition section 201 inside the area 902 ahead of execution of the predetermined processing to be performed for the target data.

20 Claims, 8 Drawing Sheets

FIG.4

| OBJECT TO BE DISPLAYED | SELECTION FREQUENCY (NUMBER OF TIMES/MONTH) | RELEVANCE |
|---|---|---|
| ICON701 | 230 | 1 |
| ICON702 | 120 | 2 |
| ICON703 | 68 | 3 |
| ICON704 | 44 | 4 |
| ICON705 | 37 | 5 |
| ICON706 | 28 | 6 |
| ICON707 | 19 | 7 |
| ICON708 | 15 | 8 |
| ICON709 | 12 | 9 |
| ICON710 | 11 | 10 |
| ICON711 | 9 | 11 |
| ICON712 | 7 | 12 |
| ICON713 | 5 | 13 |
| ICON714 | 4 | 14 |

DISPLAY CONTROLLER, IMAGE PROCESSING APPARATUS, AND DISPLAY CONTROL METHOD

BACKGROUND OF THE INVENTION

1. Field of the Invention

The present invention relates to an interface screen that displays objects to be displayed such as an icon, image, and the like thereon and, more particularly, to a display control technique of objects to be displayed on an interface screen.

2. Description of the Related Art

When predetermined processing such as image processing is performed for predetermined data such as image data, a technique in which so-called a preview display function has been employed. In this technique, in order to allow a user to previously confirm a result of predetermined image processing, an image icon previously prepared for representing predetermined data in a simplified manner or image data obtained by significantly reducing the resolution of the predetermined data is displayed to roughly reflect the image-processed state on the image icon or image data (refer to, e.g., Jpn. Pat. Appln. Laid-Open Publications Nos. 2005-208315, 2005-115683, 2004-282439, 2002-232684).

However, in the preview display function employed in the prior arts, icons or image data displayed on a preview screen only roughly represent the content of predetermined processing, so that it is difficult for a user to confirm the details of the image-processed state, which may prevent processing from being performed in accordance with user's desire.

Further, in the preview display function employed in the prior arts, icons and the like representing setting items having little relevance to the predetermined processing to be performed are arranged near an image display area (area in which predetermined data is displayed) of predetermined data that a user intend to pay attention to while icons representing setting items having high relevance are arranged away from the image display area in some case, making operability get worse.

SUMMARY OF THE INVENTION

An embodiment of the present invention has been made to solve the above problems and an object thereof is to provide a technique concerning a preview display function used when predetermined processing is performed for predetermined data, which improves visibility in preview display of the predetermined data and arranges a plurality of display objects such as icons representing setting items relevant to the predetermined processing at an adequate position on a screen so as to contribute to enhancement of user's convenience.

To solve the above problem, according to a first aspect of the present invention, there is provided a display controller comprising: a target data acquisition section that acquires target data to be subjected to predetermined processing; an extraction section that extracts, based on the target data acquired by the target data acquisition section, from a plurality of objects to be displayed, objects to be displayed associated with predetermined setting items relevant to the case where predetermined processing is applied to the target data; a relevance information acquisition section that acquires information concerning the relevance between setting items associated with the objects to be displayed extracted by the extraction section and predetermined processing applied to the target data; and a control section that displays, based on the information acquired by the relevance information acquisition section, the objects to be displayed extracted by the extraction section in the display area constituted by the first to n-th (n is an integer number more than 1) ring-like areas, in which an (x−1)th (x is an integer from 2 to n) area is located inside an x-th area, such that objects to be displayed having higher relevance than those to be displayed in the x-th area are displayed in the (x−1)th area and, at the same time, displays target data acquired by the target data acquisition section inside the first area ahead of execution of predetermined processing to be performed for the target data.

According to a second aspect of the present invention, there is provided an image processing apparatus comprising: the display controller having the configuration described above; an operation input section that receives a user's input operation made based on the content displayed by the display controller; and an image processing section that performs predetermined image processing based on the input received by the operation input section.

According to a third aspect of the present invention, there is provided a display control method comprising: acquiring target data to be subjected to predetermined processing; extracting, based on the target data acquired by the target data acquisition step, from a plurality of objects to be displayed, objects to be displayed associated with predetermined setting items relevant to the case where predetermined processing is applied to the target data; acquiring information concerning the relevance between setting items associated with the objects to be displayed extracted by the extraction step and predetermined processing applied to the target data; and then displaying, based on the information acquired by the relevance information acquisition step, the objects to be displayed extracted by the extraction step in the display area constituted by the first to n-th (n is an integer number more than 1) ring-like areas, in which an (x−1)th (x is an integer from 2 to n) area is located inside an x-th area, such that objects to be displayed having higher relevance than those to be displayed in the x-th area are displayed in the (x−1)th area and, at the same time, displaying target data acquired by the target data acquisition step inside the first area ahead of execution of predetermined processing to be performed for the target data.

DESCRIPTION OF THE DRAWINGS

FIG. 4 is a table showing an example of icons extracted by the extraction section 202 when image edit processing is applied to the image data acquired through the scan processing of the image reader section 103;

DESCRIPTION OF THE PREFERRED EMBODIMENTS

Figure 1:
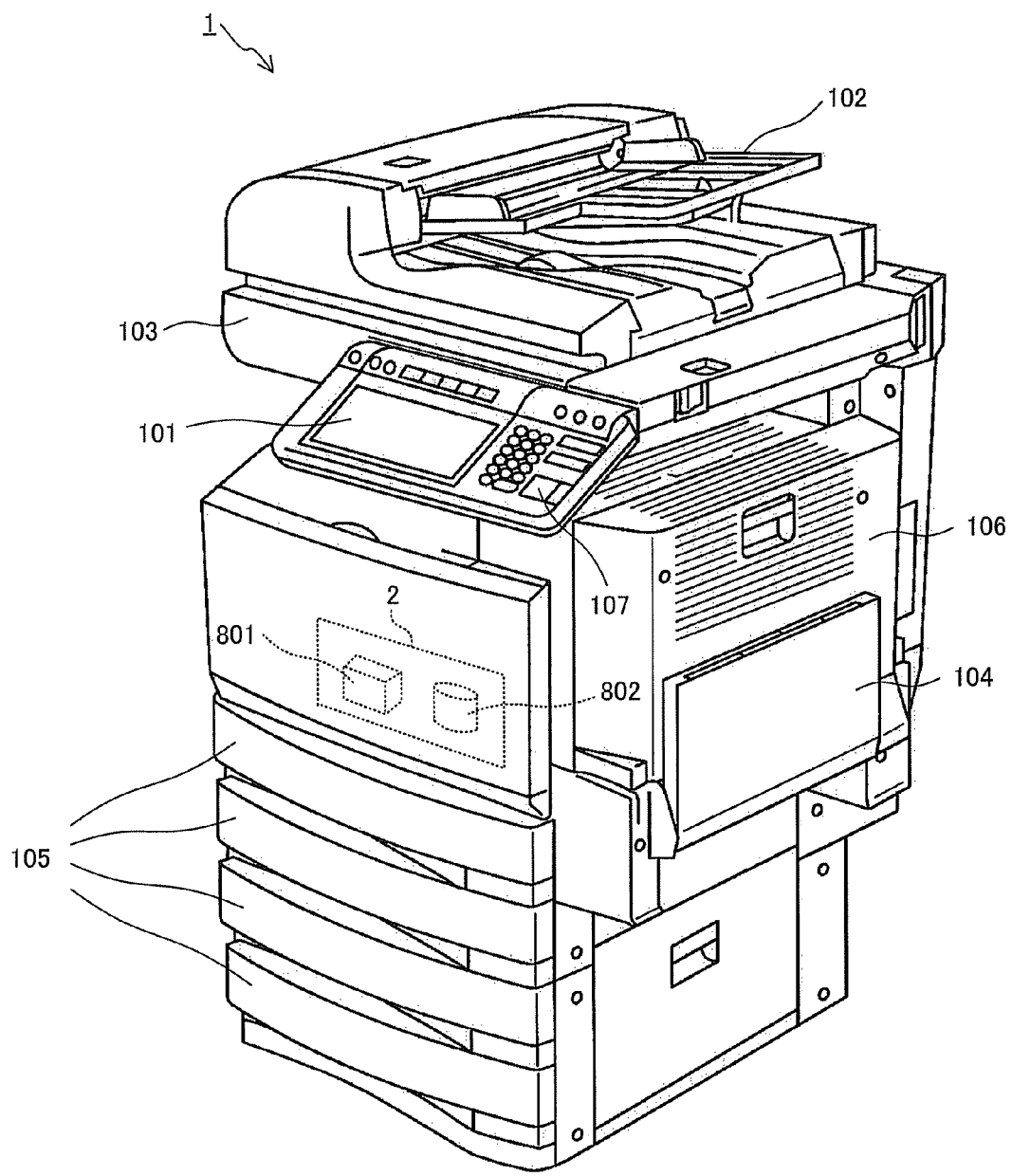
FIG. 1 is a perspective view for explaining the outline of an image processing apparatus 1 including a display controller 2 according to an embodiment of the present invention.

An embodiment of the present invention will be described below with reference to the accompanying drawings. FIG. 1 is a perspective view for explaining the outline of an image processing apparatus 1 including a display controller 2 according to an embodiment of the present invention. The image processing apparatus 1 is an MFP (Multi Function Peripheral) in this example.

The image processing apparatus 1 according to the present embodiment includes an interface screen 101, an ADF (Auto Document Feeder) 102, an image reader section 103, a manual paper feeder 104, a paper feed cassette 105, an image forming section 106, an authentication processing section 107, and a display controller 2.

Operation of the image processing apparatus 1 according to the present embodiment will be described below briefly. When copy processing (predetermined image processing) is carried out using the image processing apparatus 1, user authentication processing is first performed in the authentication processing section 107. Subsequently, based on an input operation of a user, who has been authenticated through the authentication processing, to the interface screen 101, a document set in the ADF 102 is automatically fed toward a document read position in the image reader section (image processing section) 103. The document fed in this manner is read by the image reader section 103. Subsequently, a paper is fed from the paper feed cassette 105 or manual paper feeder 104 according to a paper feed setting selected based on the user's input operation to the interface screen 101. The fed paper then reaches the image forming section (image processing section) 106 and is subjected to image forming processing based on the image read by the image reader section 103, and the copy processing is completed.

The interface screen 101 is constituted by, e.g., a touch panel display and serves also as an input operation for receiving a user's input operation made based on the content displayed on the interface screen 101.

Next, the display controller 2 will be described in detail. The display controller 2 has a role of displaying on the interface screen 101 a plurality of objects to be displayed, such as characters or icons relevant to data to be subjected to predetermined processing performed in the image processing apparatus 1, such as "data transmission", "call up bookmark list", "scan preview", "print", "data save", and "data call-up". The term "character" used here includes "symbol", and "icon" includes "figure". Although the display controller according to the present embodiment can display at least one of the character or icon as the object to be displayed, the object to be displayed is merely referred to as "icon" in the following description for the sake of simplification.

Figure 2:
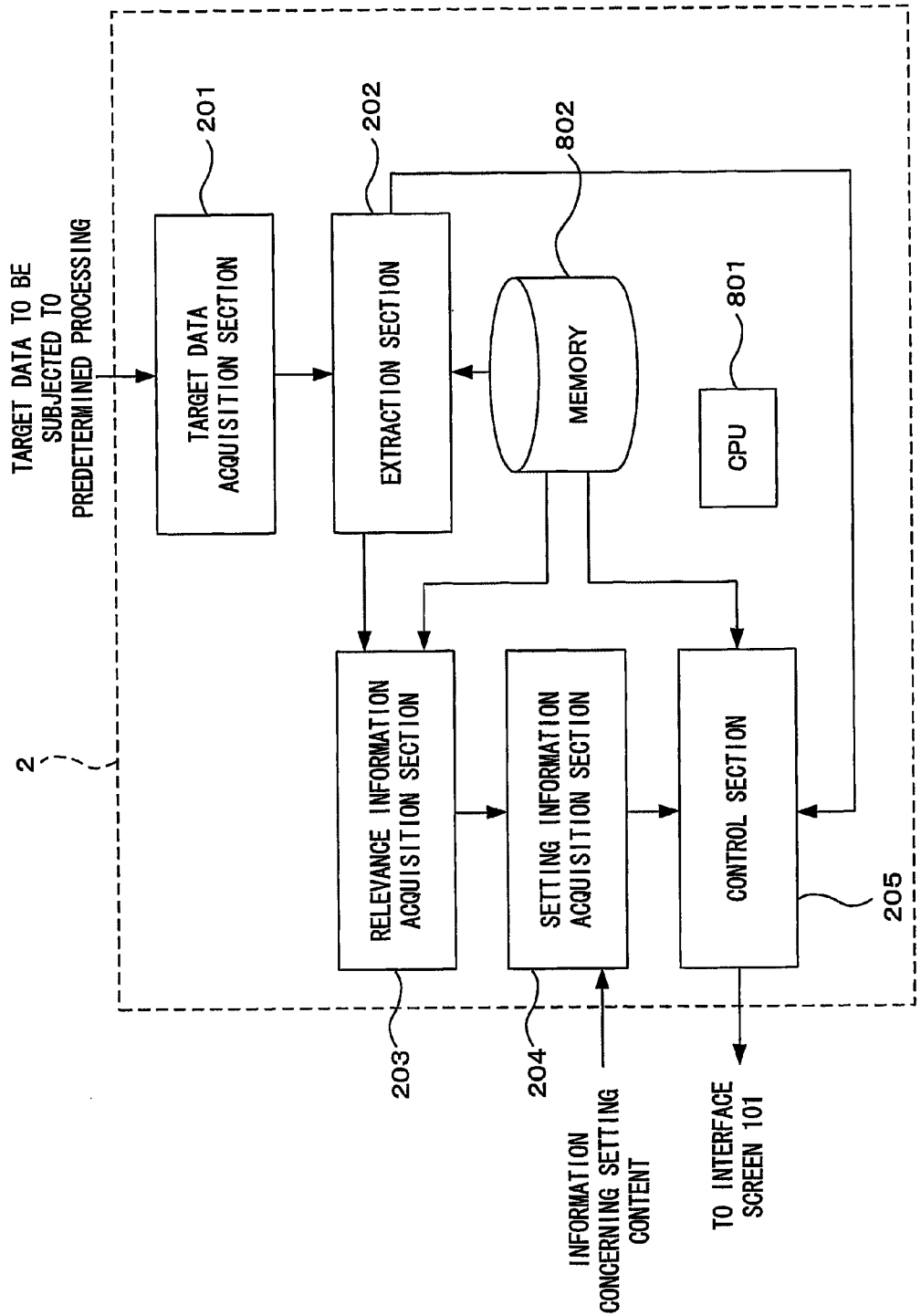
FIG. 2 is a block diagram for explaining the display controller 2 according to the present embodiment.

FIG. 2 is a block diagram for explaining the display controller 2 according to the present embodiment. The display controller 2 according to the present embodiment includes a target data acquisition section 201, an extraction section 202, a relevance information acquisition section 203, a setting information acquisition section 204, a control section 205, a CPU 801, and a MEMORY 802.

Figure 3:
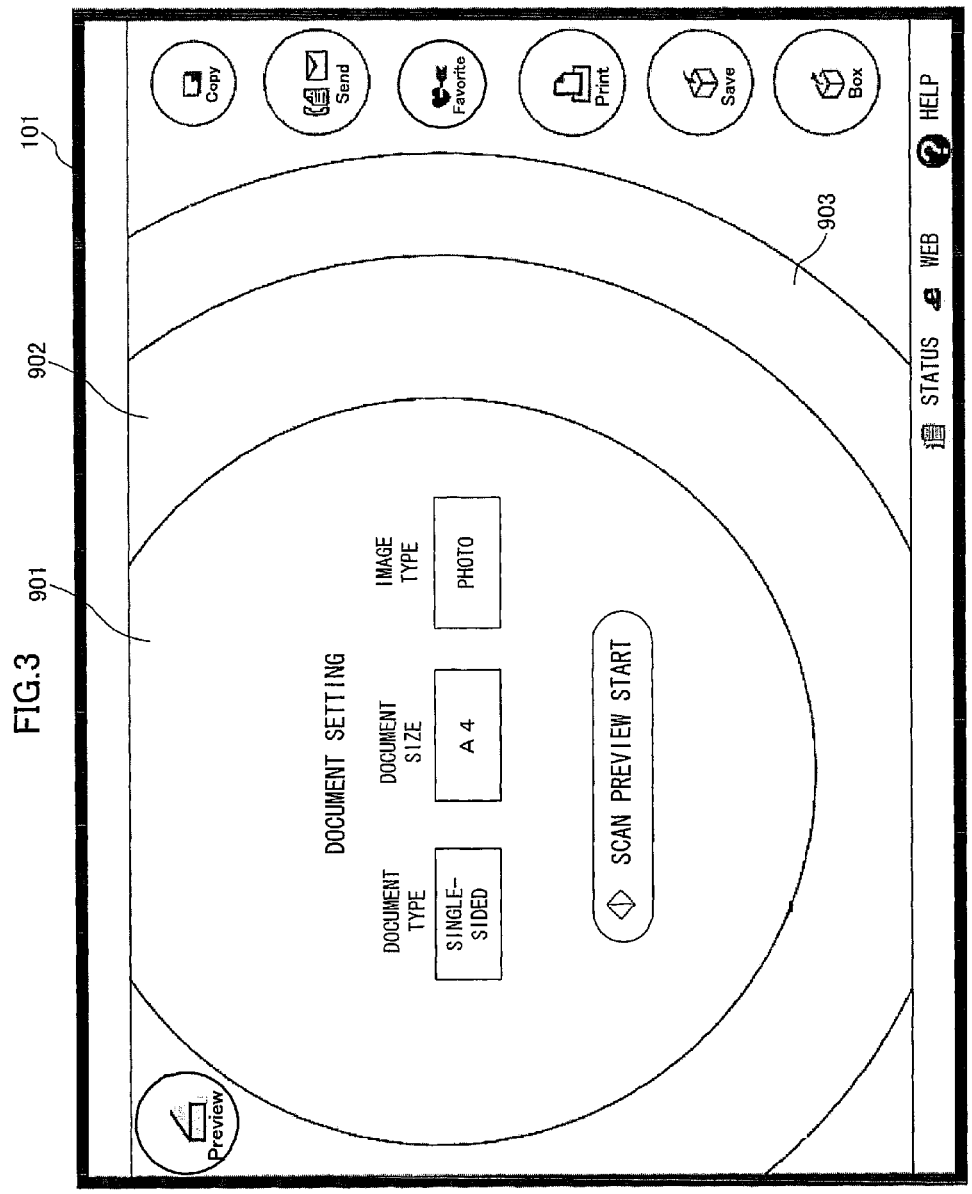
FIG. 3 is a screen display example which is displayed on the interface screen 101 under control of the control section 205 in the case where scan preview processing is performed in image read processing of the image reader section 103.

The target data acquisition section 201 acquires image data (target data) to be subjected to predetermined image processing (predetermined processing). Examples of the image data that the target data acquisition section 201 acquires include image data transmitted thereto from an external device communicable with the image processing apparatus 1, image data read from a document in the image reader section 103, and the like. Examples of the predetermined processing applied to the target data include image reading processing, print processing, copy processing, and the like. FIG. 3 is a screen display example which is displayed on the interface screen 101 under control of the control section 205 in the case where scan preview processing is performed in image read processing of the image reader section 103. A user makes settings regarding scan operation on the interface screen 101 shown in FIG. 3, such as document type (single-sided document, double-sided document, and book/magazine), document size, image type and, thereby, the document to be read is identified. When a user depresses a "scan preview start" button on the screen of FIG. 3, the target data acquisition section 201 acquires image data read by the image reader section 103.

The control section 205 sets a display area in the interface screen 101. The display area includes a first circular ring-like area 902 and a second circular ring-like area 903 which are concentrically arranged, and the first circular ring-like area 902 is located inside the second circular ring-like area 903. The above setting items for identifying a document are displayed on an area 901 located inside the first circular ring-like area 902.

Based on the image data acquired by the target data acquisition section 201, the extraction section 202 extracts, from a plurality of icons, icons associated with predetermined setting items relevant to the case where predetermined image processing is applied to the image data. The "predetermined setting items relevant to the case where predetermined image processing is applied to image data" means setting items that can be used when predetermined image processing is applied to image data and are previously registered in the MEMORY 802 in association with individual predetermined image processing.

FIG. 4 is a table showing an example of icons extracted by the extraction section 202 when image edit processing is applied to the image data acquired through the scan processing of the image reader section 103. In this example, the extraction section 202 extracts icons 701 to 714 which are associated respectively with the following image edit processing for the image data: color tuning; density tuning; data compression; resolution change; rotation; base tuning; sharpness tuning; trimming; pen tool processing (writing of underline); stamping processing (addition of watermark); transfer: erasing (erasing a given pixel part of image); black and white inversion; and scaling processing.

The relevance information acquisition section 203 acquires information concerning the relevance between setting items associated with the icons extracted by the extraction section 202 and predetermined image processing applied to image data. More specifically, the relevance information acquisition section 203 acquires a frequency (for example, selection frequency per previous month) at which a given setting item associated with the extracted icon has been selected for image read processing performed in the image processing apparatus 1. It can be seen from the example of FIG. 4 that the relevance (and selection frequency) gradually becomes lower from the top (icon 701 having highest relevance) to the bottom (icon 714 having lowest relevance) of the table. As described above, the selection frequency serves as an index indicating the relevance in the present embodiment.

Figure 5:
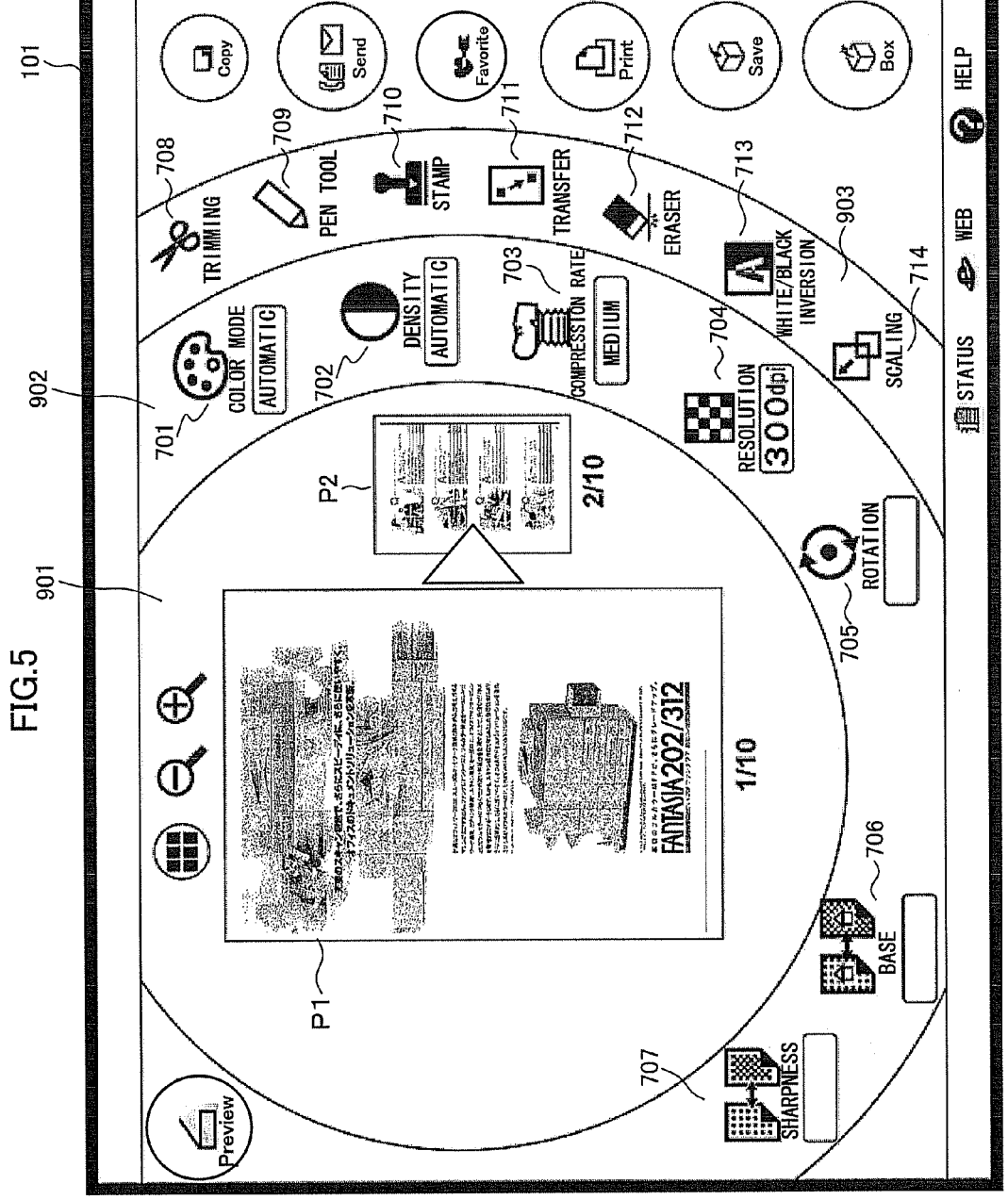
FIG. 5 is a view showing a screen display example which is displayed on the interface screen 101 under control of the control section 205.

Based on the information acquired by the relevance information acquisition section 203, the control section 205 displays the icons extracted by the extraction section 202 in the display area constituted by the first circular ring-like area 902 and second circular ring-like area 903 such that icons having higher relevance are displayed in the first circular ring-like area 902. At the same time, the control section 205 displays image data acquired by the target data acquisition section 201 inside the first circular ring-like area 902 (see FIG. 5) ahead of execution of image data save processing (image processing) in which image data is saved in a predetermined format in the image read processing for the image data. In this example, icons 701 to 707 are displayed in the first circular ring-like area 902, and icons 708 to 714 are displayed in the second circular ring-like area 903. The number of icons to be displayed in a given circular ring-like area may be determined depending on the capacity of the circular ring-like area. Alternatively, a predetermined number of icons to be arranged in each circular ring-like area may previously be determined. Further, correspondence between icons extracted by the extraction section 202 and respective circular ring-like areas may be determined by previously dividing icons associated with the setting items into some groups and associating respective circular ring-like areas with the icon groups. In this case, icons belonging to a group associated with the inner circular ring-like area have higher relevance. Thus, the relevance between a given icon associated with the setting item and predetermined processing can be known from the information indicating which group the icon is belonging to.

As described above, displaying target data in a display area inside the first circular ring-like area 902 allows a user's attention to focus on the vicinity of the center of the concentric circle. Further, displaying objects to be displayed having higher relevance to predetermined processing performed for the target data in the vicinity of the center of the concentric circle allows a user to easily make settings of the predetermined processing concerning the target data only while concentrating his or her gaze on the vicinity of the center of the concentric circle. Thus, operability can be enhanced.

The setting information acquisition section 204 acquires information concerning the setting contents about the setting items corresponding to the icons displayed in the first circular ring-like area 902 and second circular ring-like area 903. Here, it is assumed that settings are made on stamping processing corresponding to an icon 710 and pen tool processing corresponding to an icon 709. In this case, the setting information acquisition section 204 acquires information concerning the contents of the settings made on the stamping processing and pen tool processing, such as information concerning type, size, and position of a mark to be stamped on the image or information indicating at which position an underline is to be drawn relative to the image. The setting information acquisition section 204 acquires the above setting information from the content of user's input operation to the interface screen 101 or setting information transmitted thereto from an external device communicable with the image processing apparatus 1. The setting information acquisition section 204 can also acquire a processing image (image such as underline or watermark) used in the edit processing such as stamping processing or pen tool processing from the MEMORY 802.

Figure 6:
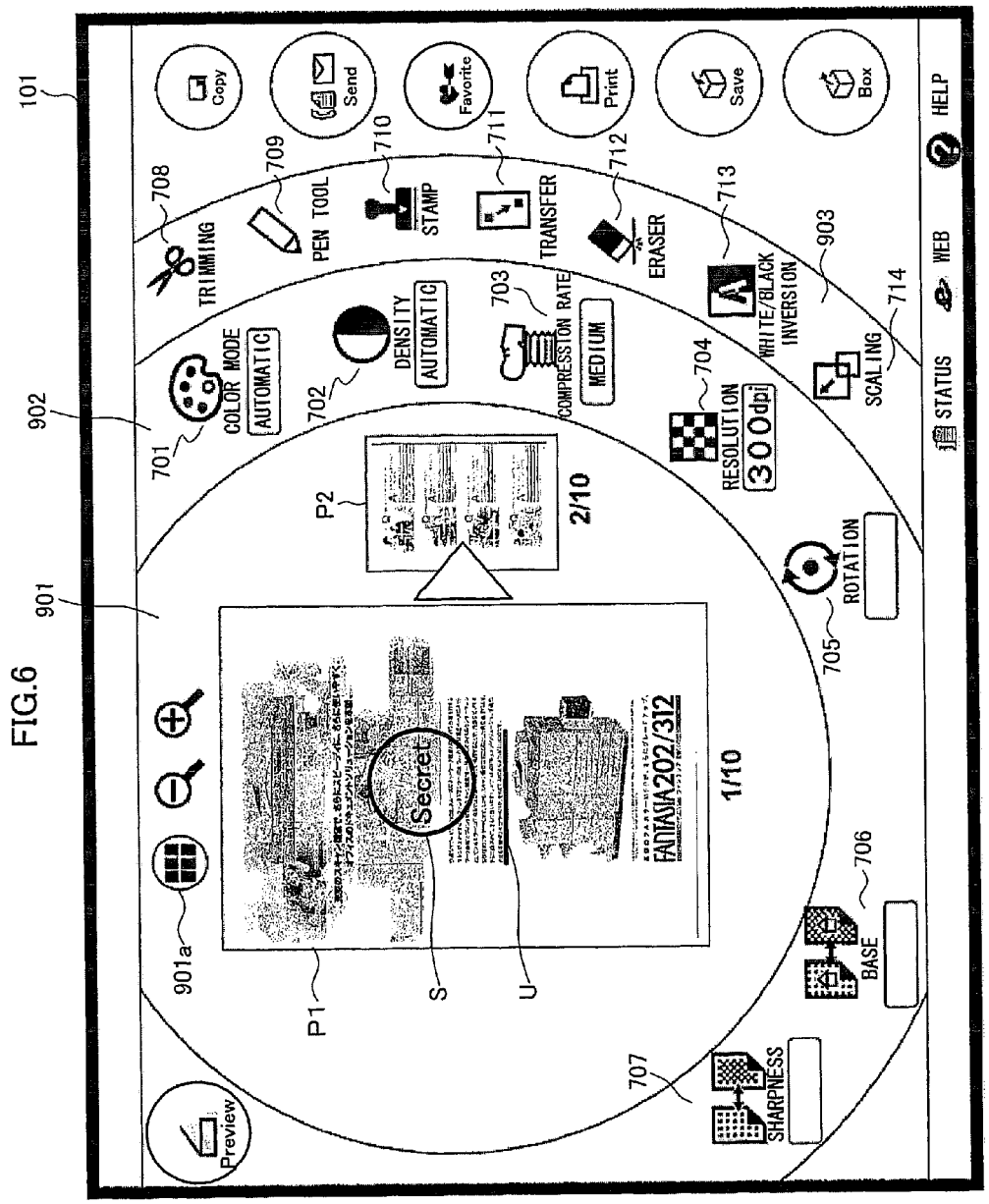
FIG. 6 is a view showing a screen display example which is displayed on the interface screen 101 under control of the control section 205.

Based on the information acquired by the setting information acquisition section 204, the control section 205 displays the image data to be displayed inside the first circular ring-like area 902 in a state where image edit processing according to the above setting contents is reflected on the image data, as shown in FIG. 6. In this example, the control section 205 displays a state where watermark S and underline U are added (superimposed on) to the image data.

Further, the control section 205 displays the image data to be displayed inside the first circular ring-like area 902 at a resolution that allows a user to visually confirm a state where image edit processing according to desired setting contents is reflected on the image data. As described above, by displaying the target data at a resolution that allows a user to visually confirm a state where predetermined processing is reflected on the target data instead of displaying the target data at its original resolution, it is possible for a user to grasp a result of predetermined processing before execution of the predetermined processing (on the preview screen) while reducing a processing load.

Figure 7:
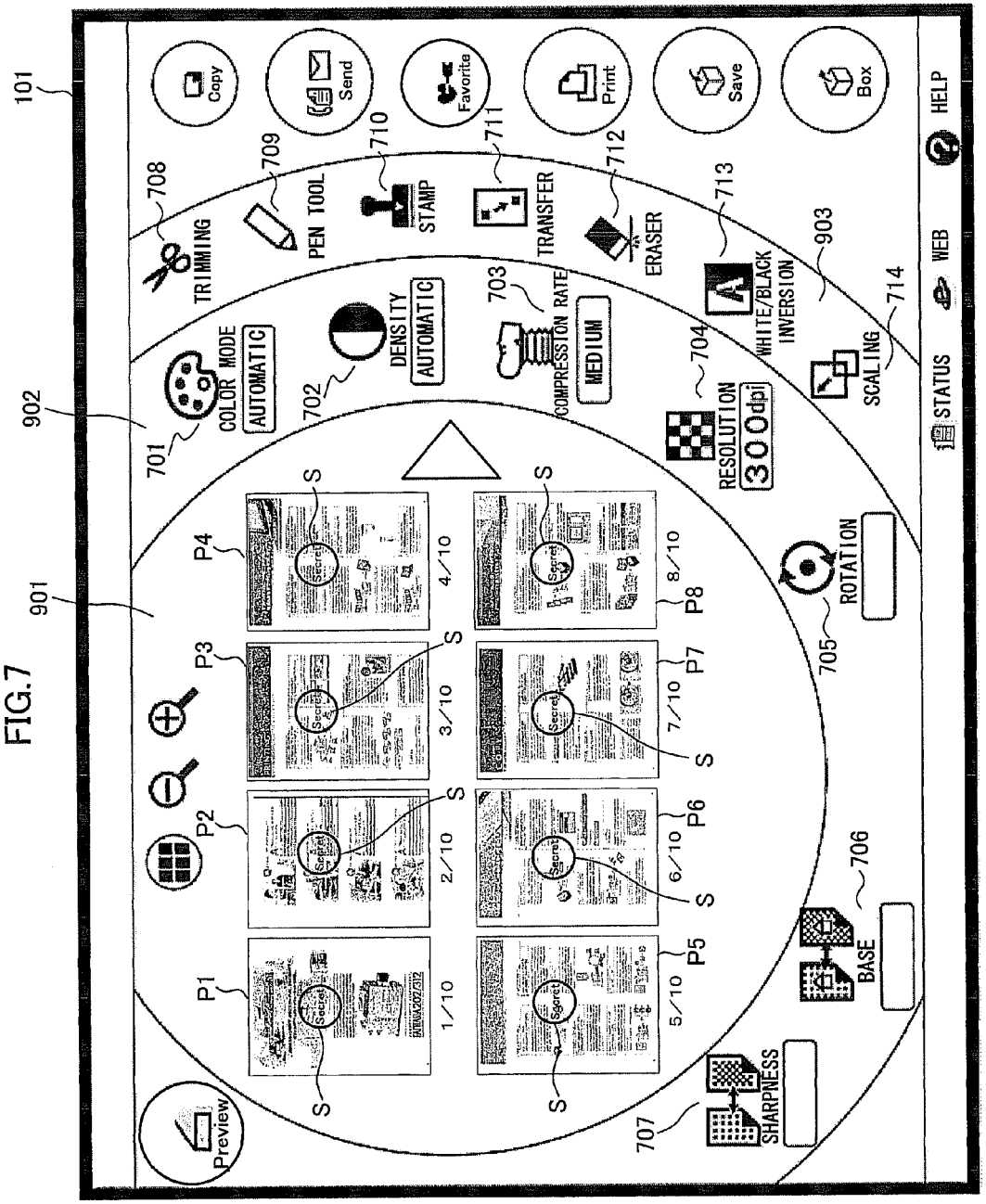
FIG. 7 is a view showing the interface screen 101 displaying a list of image data composed of a plurality of pages on which the image edit processing is reflected.

In the case where the target data is image data composed of a plurality of pages, the control section 205 displays a list corresponding to a predetermined number of pages of image data immediately inside the first circular ring-like area 902. This list is displayed when a user selects a display switch icon 901a on the screen shown in FIG. 6. FIG. 7 is a view showing the interface screen 101 displaying a list of image data composed of a plurality of pages on which the image edit processing is reflected. As described above, a user can confirm image data composed of a plurality of pages on which predetermined processing is reflected before executing the predetermined pressing, which makes it possible to previously grasp a setting mistake, such as "watermark excessively overlaps main content on the whole" or "staple position is not preferable in view of a relationship between contents of adjacent pages", that a user may become aware of only after he or she views a list of a plurality of pages. In this manner, a user can confirm an edit state, change the arrangement of pages, or switch between "front side" and "back side" in double-sided printing on the screen shown in FIG. 7.

The control section 205 arranges a plurality of icons to be displayed in a given circular ring-like area such that an icon having the highest relevance is located at a predetermined uppermost position which is positioned above the center of the circular ring-like area and, starting from the uppermost position, residual icons are arranged clockwise in the order of their relevance. As described above, the human nature that we move our eyes clockwise when observing objects arranged in a ring is utilized to attract user's attention.

The above ring-like area need not be formed in a completely ring-like shape and but may be a shape having a cutaway portion (substantially ring-like shape). That is, it is only necessary for the circular ring-like area to surround an adjacently inner area to such a degree that a user can recognize which of two adjacent circular ring-like areas is located inside. Further, a use of the ring-like area allows a user to easily grasp the relevance of the icon based on the radius (distance) from the center of the concentric circle and allows a larger number of icons to be displayed as compared to a case where the icons are displayed in a tab style or tree structure, so that the ring-like area is preferably a circular ring-like shape. However, the shape of the ring-like area is not limited to this, but may be a ring-like area having a polygonal outline. Further, a plurality of ring-like areas adjacently arranged to one another need not have similar outline, but a plurality of ring-like areas having different outlines may be combined.

Further, the control section 205 locates the display area on the left side or upper side relative to the center position of the entire screen. In general, a user interface is designed under the principle that an element having high importance should be located on the left side or upper side while an element having low importance should be located on the right side or lower side. Therefore, it is preferable to arrange the icons on the screen on the above principle. That is, when the entire display area is located on the left side, upper side, or upper-left side relative to the center position of the screen, icons having high importance are inevitably located on the left side, upper side, or upper-left side relative to the center position of the screen while icons having low importance arranged in an outer ring-like area are inevitably located on the right side, lower side, or lower-right side relative to the center of the screen. Thus, it is possible to arrange the icons on the general design principle of the user interface (in a user-friendly manner), contributing to enhancement of operability.

The CPU 801 has a role of executing various processing in the image processing apparatus 1 and display controller 2 and, at the same time, has a role of executing a program stored in the MEMORY 802 so as to realize various functions. The MEMORY 802, which is constituted by a ROM or RAM, has a role of storing various information used in the image processing apparatus 1 and display controller 2 or programs.

Figure 8:
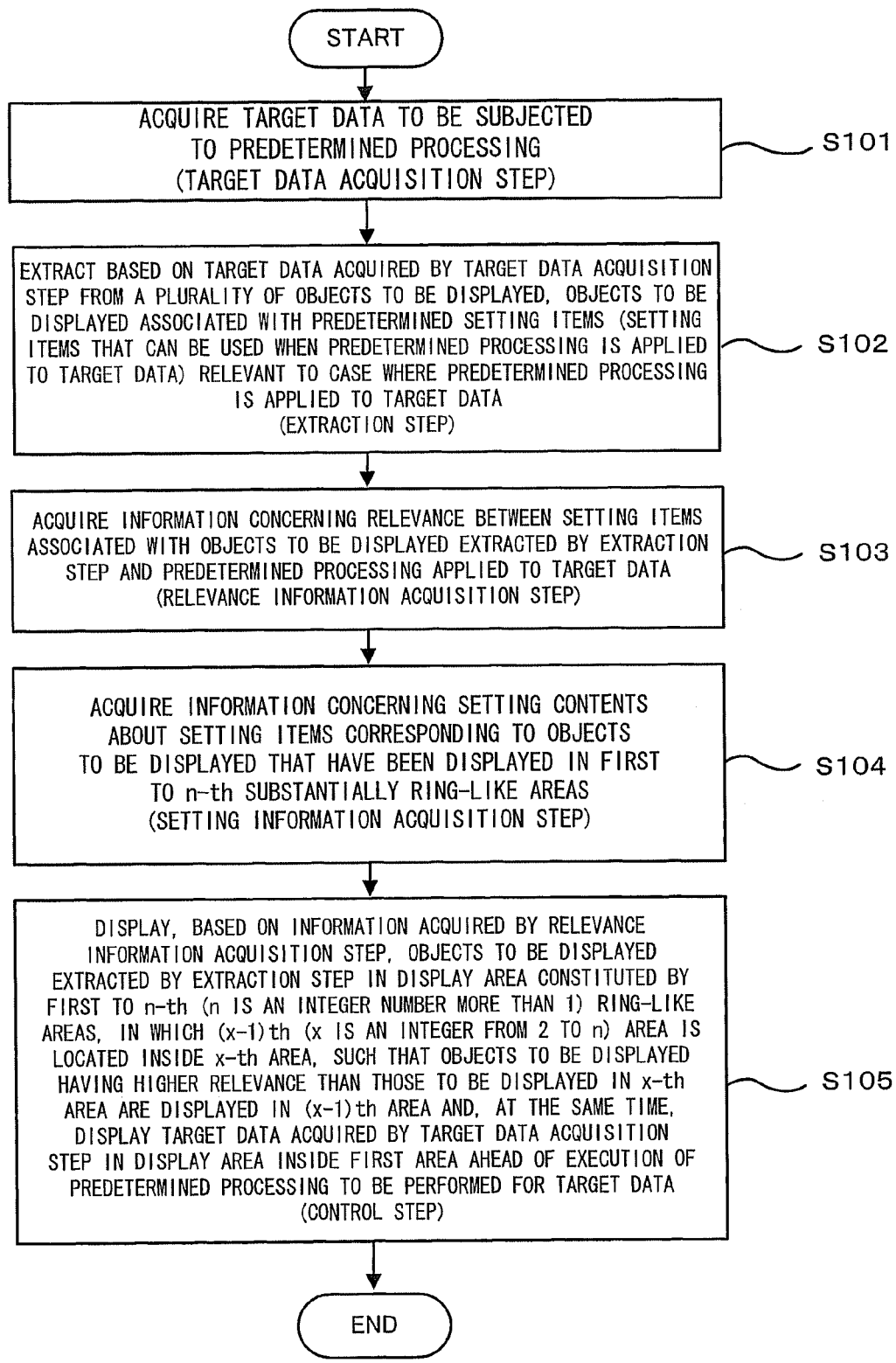
FIG. 8 is a flowchart for explaining a procedure of processing (display control method) performed in the display controller 2 according to the present embodiment.

FIG. 8 is a flowchart for explaining a procedure of processing (display control method) performed in the display controller 2 according to the present embodiment.

The target data acquisition section 201 acquires target data to be subjected to predetermined processing (target data acquisition step) (S101).

Then, based on the target data acquired by the target data acquisition step, the extraction section 202 extracts, from a plurality of objects to be displayed, objects to be displayed associated with predetermined setting items (setting items that can be used when predetermined image processing is applied to target data) relevant to the case where predetermined processing is applied to the target data (extraction step) (S102).

The relevance information acquisition section 203 acquires information concerning the relevance between setting items associated with the objects to be displayed extracted by the extraction step and predetermined processing applied to target data (relevance information acquisition step) (S103). Note that, it is assumed that the target data is image data and predetermined processing is predetermined image processing.

The setting information acquisition section 204 acquires information concerning the setting contents about the setting items corresponding to the objects to be displayed that have been displayed in the first to n-th substantially ring-like areas (setting information acquisition step) (S104).

Based on the information acquired by the relevance information acquisition step, the control section 205 displays the objects to be displayed extracted by the extraction step in the display area constituted by the first to n-th (n is an integer number more than 1) ring-like areas, in which an (x−1)th (x is an integer from 2 to n) area is located inside an x-th area, such that objects to be displayed having higher relevance than those to be displayed in the x-th area are displayed in the (x−1)th area and, at the same time, displays target data acquired by the target data acquisition step inside the first area ahead of execution of predetermined processing to be performed for the target data (control step) (S105). Note that, it is preferable that the above ring-like area be a substantially circular ring-like area.

Further, in the control step, based on the information acquired by the setting information acquisition step, the target data to be displayed inside the first area is displayed in a state where predetermined processing according to setting contents is reflected on the target data and at a resolution that allows a user to visually confirm the state where predetermined processing according to setting contents is reflected on the target data. Further, in the control step, in the case where the target data is image data composed of a plurality of pages, a list corresponding to a predetermined number of pages of the image data is displayed immediately inside the first area.

In the control step, the display area is located on the left side or upper side relative to the center position of the entire screen. Further, in the control step, a plurality of objects to be displayed in a given substantially ring-like area is arranged such that an object to be displayed having the highest relevance is located at a predetermined uppermost position which is positioned above the center of the ring-like area and, starting from the uppermost position, residual objects to be displayed are arranged clockwise in the order of their relevance.

The above respective steps in the processing performed in the display controller 2 are realized by the CPU 801 executing a display control program stored in the MEMORY 802.

In the embodiment, there has been explained the case where the function for implementing the present invention is previously stored inside the apparatus, but the present invention is not limited thereto, and a similar function may be downloaded from the network into the apparatus or a recording medium on which a similar function is stored is installed in the apparatus. The recording medium may be any form of recording medium such as CD-ROM which can store programs and is readable by the apparatus. The function which can be previously obtained through installing or downloading may be realized in cooperation with the OS (operating system) inside the apparatus.

Although a storage area from which the extraction section 202, relevance information acquisition section 203, and control section 205 read information is realized by the MEMORY 802 (i.e., MEMORY 802 stores necessary information) in the present embodiment for the sake of simplicity, the storage area may be realized by, e.g., a database provided outside the image processing apparatus 1. That is, the storage area may be provided at any location as long as it can exchange information with the extraction section 202, relevance information acquisition section 203, and control section 205.

Further, although the image processing apparatus 1 is an MFP in the present embodiment, it goes without saying that the present invention is applicable to a printer, scanner, PC (Personal Computer), and MMK (Multi Media Kiosk), i.e., an apparatus that performs predetermined image processing such as image forming processing, image read processing, image edit processing, and image pickup processing.

As described above, according to the present embodiment, by displaying all images captured by, e.g., scan processing in a "real preview" (using actually captured image data), it is possible for a user to confirm a final image to be printed out in a state closer to the actual processing result, thereby avoiding execution of unnecessary processing such as printing of image data that has been processed in a fashion not complying with user's intention or writing thereof in a hard disk.

Although the exemplary embodiment of the present invention has been shown and described, it will be apparent to those having ordinary skill in the art that a number of changes, modifications, or alternations to the invention as described herein may be made within the spirit of the present invention.

As has been described in detail, according to the present invention, it is possible to provide a technique concerning a preview display function used when predetermined processing is performed for predetermined data, which improves visibility in preview display of the predetermined data and arranges a plurality of display objects such as icons representing setting items relevant to the predetermined processing at an adequate position on a screen so as to contribute to enhancement of user's convenience.

What is claimed is:

1. A display controller comprising:
   a target data acquisition section that acquires target data to be subjected to predetermined processing;
   an extraction section that extracts, based on the target data acquired by the target data acquisition section, from a plurality of objects to be displayed, objects to be displayed associated with predetermined setting items relevant to the case where predetermined processing is applied to the target data;
   a relevance information acquisition section that acquires information concerning the relevance between setting items associated with the objects to be displayed extracted by the extraction section and predetermined processing applied to the target data; and
   a control section that displays, based on the information acquired by the relevance information acquisition section, the objects to be displayed extracted by the extraction section in the display area constituted by the first to n-th (n is an integer number more than 1) ring-like areas, in which an (x−1)th (x is an integer from 2 to n) area is located inside an x-th area, such that objects to be displayed having higher relevance than those to be displayed in the x-th area are displayed in the (x−1)th area and, at the same time, displays the target data acquired by the target data acquisition section inside the first area ahead of execution of the predetermined processing to be performed for the target data;
   a setting information acquisition section that acquires information concerning setting contents about the setting items corresponding to the plurality of objects to be displayed that have been displayed in the first to n-th substantially ring-like areas, wherein the control section displays, based on the information acquired by the setting information acquisition section, the target data to be displayed inside the first area in a state where the predetermined processing according to the setting contents is reflected on the target data.

2. The display controller according to claim 1, wherein the predetermined setting items relevant to the case where predetermined processing is applied to the target data are setting items that can be used when the predetermined processing is applied to the target data.

3. The display controller according to claim 1, wherein the control section displays the target data to be displayed inside the first area at a resolution that allows a user to visually confirm a state where the predetermined processing according to the setting contents is reflected on the target data.

4. The display controller according to claim 1, wherein the target data is image data, and
   the predetermined processing is predetermined image processing.

5. The display controller according to claim 1, wherein in the case where the target data is image data composed of a plurality of pages, the control section displays a list corresponding to a predetermined number of pages of the image data immediately inside the first area.

6. The display controller according to claim 1, wherein the control section arranges a plurality of objects to be displayed in a given substantially ring-like area such that an object to be displayed having the highest relevance is located at a predetermined uppermost position (which is positioned above the center of the circular ring-like area) in the circular ring-like area and, starting from the uppermost position, residual objects to be displayed are arranged clockwise in the order of their relevance.

7. The display controller according to claim 1, wherein the substantially ring-like area is a substantially circular ring-like area.

8. The display controller according to claim 1, wherein the control section locates the display area on the left side or upper side relative to the center position of the entire screen.

9. The display controller according to claim 1, wherein the objects to be displayed include characters or icons.

10. An image processing apparatus comprising:
    the display controller according to claim 1;
    an operation input section that receives a user's input operation made based on the content displayed by the display controller; and
    an image processing section that performs predetermined image processing based on the input received by the operation input section.

11. A display control method comprising:
    acquiring target data to be subjected to predetermined processing;
    extracting, based on the target data acquired by the target data acquisition step, from a plurality of objects to be displayed, objects to be displayed associated with predetermined setting items relevant to the case where the predetermined processing is applied to the target data;
    acquiring information concerning the relevance between setting items associated with the objects to be displayed extracted by the extraction step and the predetermined processing applied to the target data; and then
    controlling, based on the information acquired by the relevance information acquisition step, the objects to be displayed extracted by the extraction step in the display area constituted by the first to n-th (n is an integer number more than 1) ring-like areas, in which an (x−1)th (x is an integer from 2 to n) area is located inside an x-th area, such that objects to be displayed having higher relevance than those to be displayed in the x-th area are displayed in the (x−1)th area and, at the same time, displaying target data acquired by the target data acquisition step inside the first area ahead of execution of the predetermined processing to be performed for the target data;
    acquiring information concerning the setting contents about the setting items corresponding to the objects to be displayed that have been displayed in the first to n-th substantially ring-like areas,
    displaying, based on the information acquired by the setting information acquisition section, the target data to be displayed inside the first area in a state where the predetermined processing according to the setting contents is reflected on the target data.

12. The display control method according to claim 11, wherein
    the predetermined setting items relevant to the case where the predetermined processing is applied to the target data are setting items that can be used when the predetermined processing is applied to the target data.

13. The display control method according to claim 11, comprising:
    acquiring information concerning the setting contents about the setting items corresponding to the objects to be displayed that have been displayed in the first to n-th substantially ring-like areas, wherein
    the control step displays, based on the information acquired by the setting information acquisition step, the target data to be displayed inside the first area in a state where the predetermined processing according to the setting contents is reflected on the target data.

14. The display control method according to claim 13, wherein
the control step displays the target data to be displayed inside the first area at a resolution that allows a user to visually confirm a state where the predetermined processing according to the setting contents is reflected on the target data.

15. The display control method according to claim 13, wherein
in the case where the target data is image data composed of a plurality of pages, the control step displays a list corresponding to a predetermined number of pages of the image data immediately inside the first area.

16. The display control method according to claim 11, wherein
the target data is image data, and
the predetermined processing is predetermined image processing.

17. The display control method according to claim 11, wherein
the control step arranges a plurality of objects to be displayed in a given substantially ring-like area such that an object to be displayed having the highest relevance is located at a predetermined uppermost position (which is positioned above the center of the circular ring-like area) in the circular ring-like area and, starting from the uppermost position, residual objects to be displayed are arranged clockwise in the order of their relevance.

18. The display control method according to claim 11, wherein
the substantially ring-like area is a substantially circular ring-like area.

19. The display control method according to claim 11, wherein
the control step locates the display area on the left side or upper side relative to the center position of the entire screen.

20. An image forming apparatus, comprising:
a display controller including:
a target data acquisition section that acquires target data to be subjected to predetermined processing,
an extraction section that extracts, based on the target data acquired by the target data acquisition section, from a plurality of objects to be displayed,
objects to be displayed associated with predetermined setting items relevant to the case where predetermined processing is applied to the target data,
a relevance information acquisition section that acquires information concerning the relevance between setting items associated with the objects to be displayed extracted by the extraction section and predetermined processing applied to the target data, and
a control section that displays, based on the information acquired by the relevance information acquisition section, the objects to be displayed extracted by the extraction section in the display area constituted by the first to n-th (n is an integer number more than 1) ring-like areas, in which an (x−1)th (x is an integer from 2 to n) area is located inside the x-th area, such that objects to be displayed having higher relevance than those to be displayed in the x-th area are displayed in the (x−1)th area and, at the same time, displays the target data acquired by the target data acquisition section inside the first area ahead of execution of the predetermined processing to the be performed for the target data; and an image forming unit configured to form an image on a sheet;
a setting information acquisition section that acquires information concerning setting contents about the setting items corresponding to the plurality of objects to be displayed that have been displayed in the first to n-th substantially ring-like areas, wherein the control section displays, based on the information acquired by the setting information acquisition section, the target data to be displayed inside the first area in a state where the predetermined processing according to the setting contents is reflected on the target data.

* * * * *